(12) United States Patent
van Ieperen

(10) Patent No.: US 7,757,001 B2
(45) Date of Patent: Jul. 13, 2010

(54) SYSTEM, METHOD AND GRAPHICAL USER INTERFACE FOR IDENTIFYING IMAGE FROM REMOTE SITE DURING SCREEN SHARING

(75) Inventor: Taco van Ieperen, Calgary (CA)

(73) Assignee: SMART Technologies ULC (CA)

( * ) Notice: Subject to any disclaimer, the term of this patent is extended or adjusted under 35 U.S.C. 154(b) by 736 days.

(21) Appl. No.: 10/132,705

(22) Filed: Apr. 26, 2002

(65) Prior Publication Data

US 2003/0204628 A1 Oct. 30, 2003

(51) Int. Cl.
G06F 15/16 (2006.01)

(52) U.S. Cl. .................. 709/246; 709/217; 709/227; 709/229; 345/2.2; 715/200; 715/204; 715/751; 715/778; 715/779; 715/803

(58) Field of Classification Search .............. 715/700, 715/200, 204, 751, 778, 779, 803; 709/201–205, 709/217, 227, 229, 246; 345/2.2
See application file for complete search history.

(56) References Cited

U.S. PATENT DOCUMENTS

| | | | | | |
|---|---|---|---|---|---|
| 5,241,625 | A | * | 8/1993 | Epard et al. ................ | 345/502 |
| 5,727,155 | A | * | 3/1998 | Dawson .................... | 709/205 |
| 5,758,110 | A | * | 5/1998 | Boss et al. ................ | 715/751 |
| 5,760,769 | A | * | 6/1998 | Petrie ....................... | 709/205 |
| 5,874,960 | A | * | 2/1999 | Mairs et al. ............... | 715/733 |
| 5,877,762 | A | * | 3/1999 | Young ....................... | 715/803 |
| 5,913,920 | A | * | 6/1999 | Adams et al. ............. | 709/204 |
| 5,920,313 | A | * | 7/1999 | Diedrichsen et al. ...... | 715/767 |
| 5,920,316 | A | * | 7/1999 | Oran et al. ................ | 715/779 |
| 5,995,096 | A | * | 11/1999 | Kitahara et al. ........... | 715/753 |
| 6,002,397 | A | * | 12/1999 | Jaaskelainen, Jr. ........ | 715/805 |
| 6,049,334 | A | * | 4/2000 | Bates et al. ............... | 715/755 |
| 6,141,022 | A | * | 10/2000 | Anfossi et al. ............ | 345/545 |
| 6,204,847 | B1 | * | 3/2001 | Wright ...................... | 715/804 |
| 6,268,855 | B1 | * | 7/2001 | Mairs et al. ............... | 715/784 |
| 6,437,803 | B1 | * | 8/2002 | Panasyuk et al. .......... | 715/733 |
| 6,570,590 | B1 | * | 5/2003 | Dubrow et al. ............ | 715/751 |
| 6,571,245 | B2 | * | 5/2003 | Chun et al. ................ | 707/10 |
| 6,584,493 | B1 | * | 6/2003 | Butler ....................... | 709/204 |

(Continued)

OTHER PUBLICATIONS

H. Ishii TeamWorkStation: towards a seamless shared workspace,1990 ,Computer Supported Cooperative Work ,Proceedings of the 1990 ACM conference on Computer-supported cooperative work ,ACM Press New York, NY, USA, pp. 13-26.*
Control Your PC Remotely With TridiaVNC. PC World, Dec. 2001, vol. 19 Issue 12, p. 196, 1/3p, 1c; (AN 5459763), http://www.pcworld.com/howto/article/0,aid,65154,pg,4,00.asp.*
XP Sends 9X Packing, Sep. 3, 2001, EWEEK, htt://www.eweek.com.*

(Continued)

*Primary Examiner*—Dohm Chankong
(74) *Attorney, Agent, or Firm*—Katten Muchin Rosenman LLP

(57) ABSTRACT

A distributed computer network includes at least two computers. Each of the at least two computers runs an application sharing program to enable an image generated by one computer to be displayed by at least one other computer. At least one of the at least two computers executes an image modifying routine to alter the appearance of an image generated by the one computer prior to display on the at least one other computer. In this manner, a user of the at least one other computer can tell at a glance if an image being presented is an image that has been received from the one computer or is its own desktop graphical user interface.

29 Claims, 9 Drawing Sheets

U.S. PATENT DOCUMENTS

| | | | |
|---|---|---|---|
| 6,587,128 B2 * | 7/2003 | Kanevsky et al. | 715/768 |
| 6,691,154 B1 * | 2/2004 | Zhu et al. | 709/204 |
| 6,859,928 B2 * | 2/2005 | Wright | 718/102 |
| 7,081,904 B2 * | 7/2006 | Zoller et al. | 345/661 |
| 2002/0026323 A1 * | 2/2002 | Sakaguchi et al. | 705/1 |
| 2002/0161895 A1 * | 10/2002 | Appiah et al. | 709/227 |
| 2003/0084169 A1 * | 5/2003 | Zhu et al. | 709/229 |
| 2003/0189601 A1 * | 10/2003 | Ben-Shachar et al. | 345/810 |

OTHER PUBLICATIONS

Richardson, T; Stafford-Graser, Q. Wood, K.R., Hopper, Andy, Virtual Network Computing, Jan.-Feb. 1998, http://computer.org/internet.*

Wayne Jr., Rash, Reach out and touch your PC (1996), InformationWeek; Sep. 23, 1996 Issue 598, p. 79, 6p, 2charts, ISSN 8750-6874.*

* cited by examiner

SYSTEM, METHOD AND GRAPHICAL USER INTERFACE FOR IDENTIFYING IMAGE FROM REMOTE SITE DURING SCREEN SHARING

FIELD OF THE INVENTION

The present invention relates generally to image sharing among different computers and in particular to a method and system for displaying graphical information from a host computer on at least one remote computer in such a manner that it is evident on the remote computer that the image is from the host computer. The present invention also relates to a desktop graphical user interface image that identifies to a viewer when it is an image that has been received from a host computer.

BACKGROUND OF THE INVENTION

Networked computer systems including computers executing application sharing programs to permit the computers to share displayed information are widely known and used. In these computer systems, one computer (the host computer) transmits images of its desktop to a plurality of remote computers using such an application sharing program. The remote computers may use a variety of strategies to display the host computer desktop images depending on the operating environments of the remote computers.

Windows is a well-known operating environment for computers. In this operating environment, information to be presented to a user is displayed by a desktop graphical user interface in one or more windows. In computer systems that share displayed information and operate in the Windows environment, when images of the host computer desktop are transmitted to the remote computers, each remote computer displays the host computer desktop image within a window. Unfortunately, displaying the host desktop image in this manner can be problematic. If the host computer and the remote computers are running at the same display resolution, there generally will not be enough space in the windows to show the entire host computer desktop images due to the space taken by the borders of the windows.

To overcome this problem, a number of solutions have been proposed. One solution has been to scale the host computer desktop images prior to display in the windows. Unfortunately, this solution has proven to be unsatisfactory, because it results in loss of image data and decreased resolution. Another solution has been to provide the windows with scroll bars to allow users to view the entire host computer desktop images while maintaining image resolution. Although the entire host computer desktop images are available for viewing, only sections of the host computer desktop images can viewed at one time. In interactive environments, not being able to see the entire host computer desktop images is unacceptable. Yet another solution has been to display the host computer desktop images over the full screens of the remote computers. In this scenario, no space is required for the borders of windows and so display resolution issues are solved. Unfortunately, this scenario can be very confusing for users due to the fact that the host computer desktop images may look very similar, or even identical, to the desktop graphical user interfaces of the remote computers. This can make it very difficult for a user to tell at a glance if they are looking at their desktop graphical user interface or a host computer desktop image.

As will be appreciated, improvements in graphical user interfaces in environments where computers share displayed information, are desired. It is therefore an object of the present invention to provide a novel method and system for displaying shared image from a host computer on at least one remote computer in such a manner that it is evident on the remote computer that the image is from the host computer. It is also an object of the present invention to provide a novel desktop graphical user interface image that identifies to a viewer when it is an image that has been received from a host computer.

SUMMARY OF THE INVENTION

According to one aspect of the present invention there is provided in a distributed computer network where displayed information is shared between at least two computers, a method of displaying shared images comprising the steps of:

identifying at least one selected portion of an image generated by one computer that is to be shared with at least one other computer; and visually modifying the at least one selected portion of said image prior to said image being displayed by said at least one other computer.

Preferably, the at least one other computer displays the image full screen and the at least one selected portion of the image includes a task bar. It is also preferred that the at least one selected portion of the image further includes windows within the image and scroll bars. In a preferred embodiment, the modifying includes placing hatching over the at least one selected portion. Optionally, when the at least one selected portion is the task bar, hatching is not applied to it when the task bar is active.

In one embodiment, the modifying is performed prior to transmission of the image from the one computer to the at least one other computer. In another embodiment, the modifying is performed after transmission of the image from the one computer to the at least one other computer.

According to another aspect of the present invention there is provided a distributed computer network including at least two computers, each of said at least two computers running an application sharing program to enable an image generated by one computer to be displayed by at least one other computer, at least one of said at least two computers executing an image modifying routine to alter the appearance of an image generated by said one computer prior to display on said at least one other computer.

According to yet another aspect of the present invention there is provided a computer readable medium including computer program code for modifying an image generated by one computer prior to display on at least one other computer, said computer program code including:

computer program code for identifying at least one selected portion of said image; and computer program code for visually modifying the at least one selected portion of said image prior to said image being displayed by said at least one other computer.

According to still yet another aspect of the present invention there is provided a distributed computer network including at least two computers, each of said at least two computers operating in a Windows environment and running an application sharing program to enable a desktop image generated by a host computer to be displayed full screen by at least one guest computer, one of said host computer and at least one guest computer executing an image modifying routine to modify the host computer desktop image prior to display on said at least one guest computer while maintaining generally the overall presentation of the host computer desktop image.

According to still yet another aspect of the present invention there is provided a desktop graphical user interface image displayed full screen on a computer monitor including:

at least one of a task bar, a scroll bar and a window; and a pattern over said at least one of said task bar, scroll bar and window.

The present invention provides advantages in that shared images transmitted from a host computer to one or more guest computers are modified before being displayed by the guest computers. In this manner, users of the guest computers can tell at a glance if the images being presented are images that have been received from the host computer. Since only selected portions of the host computer images are modified, the modifications to the host computer images do not substantially distract from the overall presentation of the host computer images.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
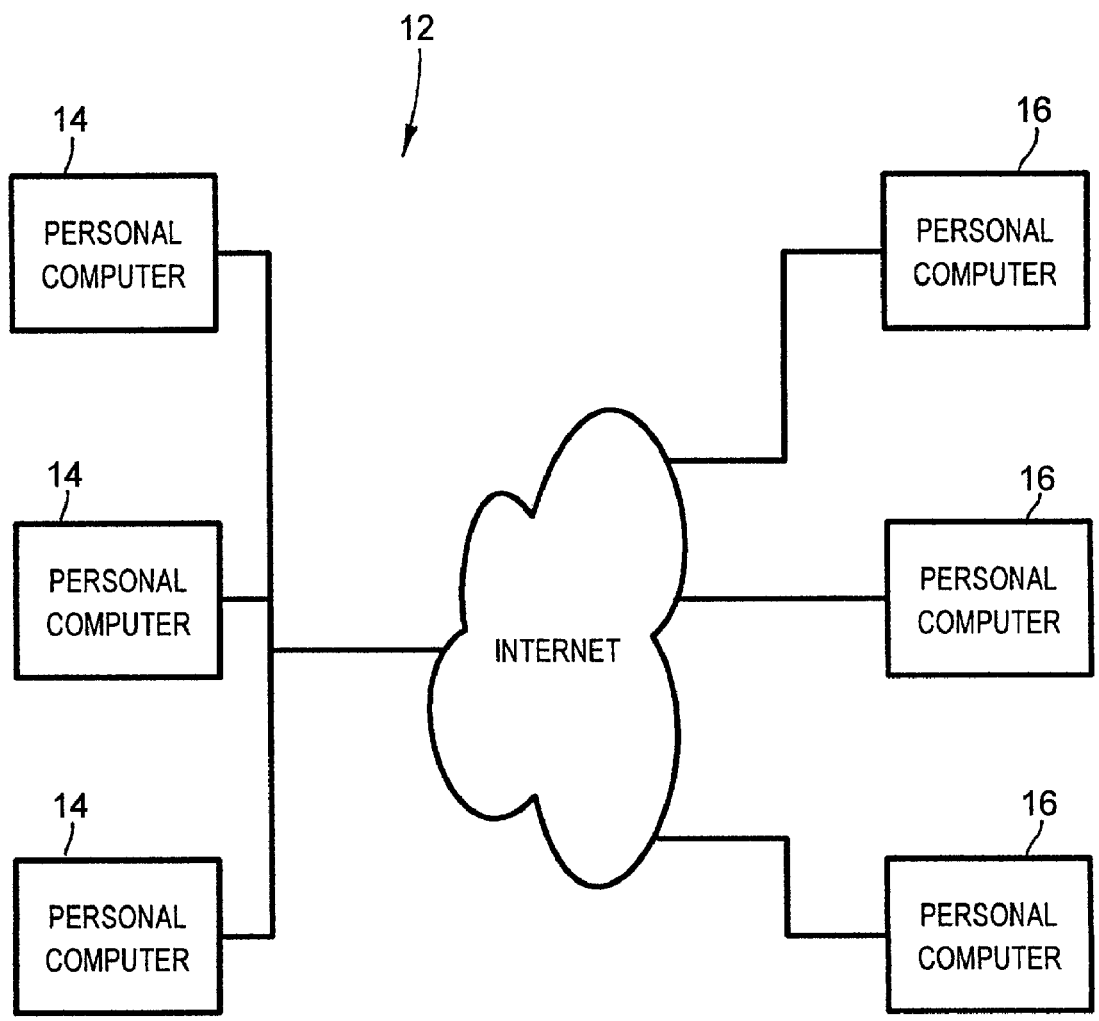
FIG. 1 is a schematic block diagram showing a computer network including a plurality of personal computers, the personal computers running application sharing programs and sharing displayed information.

Turning now to FIG. 1, a distributed computer network is shown and is generally identified by reference numeral 10. As can be seen, computer network 10 includes a local area network 12 including a plurality of interconnected personal computers 14 at different physical locations. Personal computers 14 in the local area network 12 communicate with each other and with personal computers 16 located at different geographical locations over a distributed network 18 such as the Internet.

Each of the personal computers 14 and 16 operates in a Windows environment and includes a desktop graphical user interface. The desktop allows information to be presented to a user in windows. Each personal computer runs an application sharing program that permits the personal computers 14 and 16 to share displayed information. In this particular example, the personal computers 14 and 16 run SMART Conference Software. As is well known, this application sharing program allows a meeting to be set up between personal computers with one personal computer being designated as a host computer and the remaining personal computers being designated as guest computers. Images of the host computer desktop are transmitted to the guest computers in the meeting and are displayed on the monitors of the guest computers full screen.

To avoid user confusion when a guest computer is displaying an image of the host computer desktop, the host computer executes an imaging modifying routine that modifies selected portions of the host computer desktop image prior to transmission to the guest computers for display. In this manner a user of a guest computer can tell at a glance if the image being presented, is its local desktop graphical user interface or an image of the host computer desktop.

In the present embodiment, the imaging modifying routine identifies the Windows task bar, and windows related to the application sharing program. Any of these elements that are visible in the host computer desktop image are overlaid with a hatched pattern. The name of the host computer is also placed in the center of the Windows task bar as well as over the windows related to the application sharing program. By modifying the host computer desktop image in this manner, visible cues are provided to users of the guest computers to signify that the displayed images are images of the host computer desktop without substantially distracting from the overall presentation of the host computer desktop images.

Figure 2:
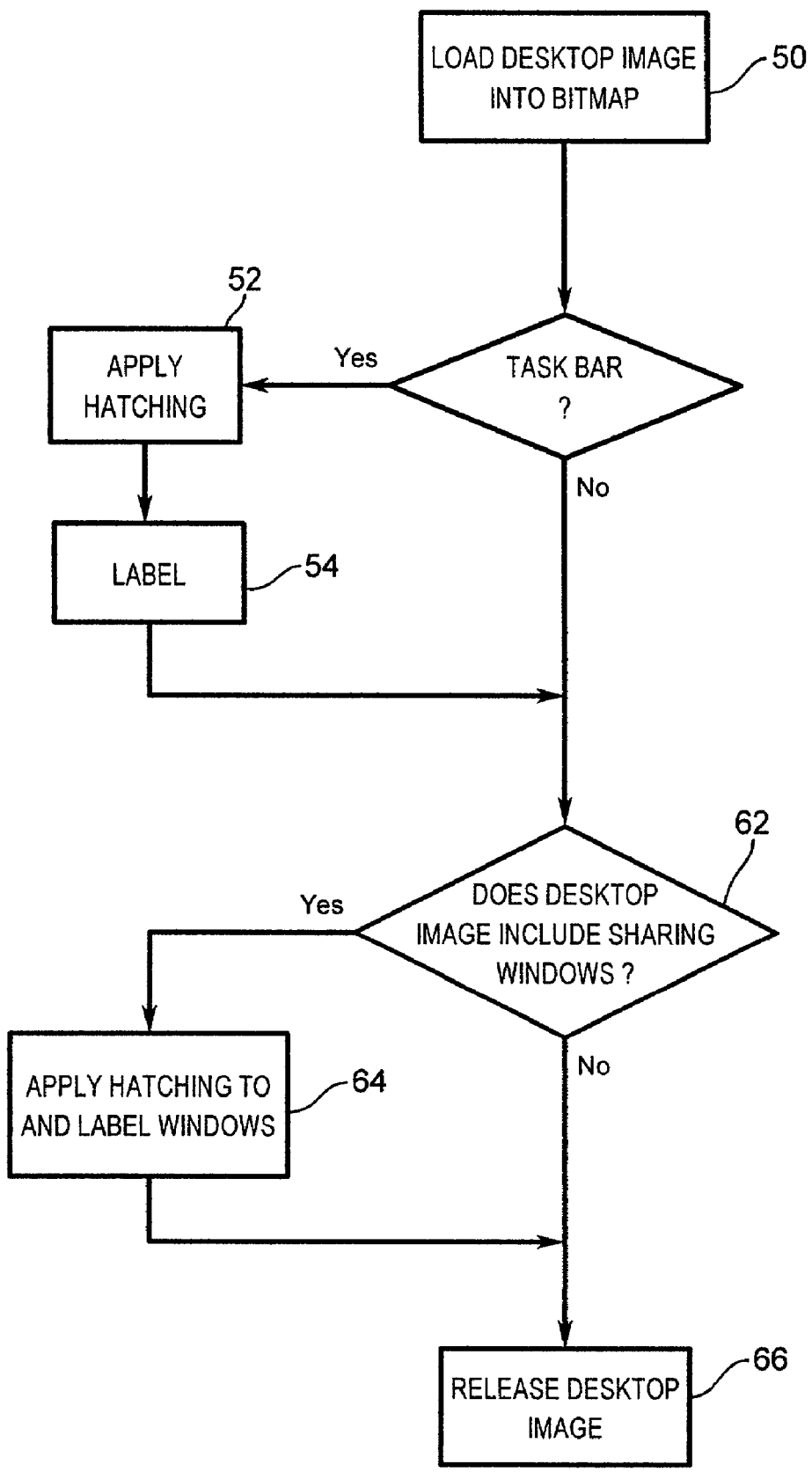
FIG. 2 is a flow chart showing the steps performed by a host computer during execution of an image modifying routine.

The manner by which the imaging modifying routine modifies the host computer desktop images will now be described with particular reference to FIG. 2. When a host computer desktop image is to be transmitted to a guest computer, the imaging modifying routine captures the host computer desktop image into a bitmap (step 50). Visible portions of the Windows task bar are then located within the bitmap image and these portions are visually modified (step 52). In this particular embodiment, the task bar portions are visually modified by applying hatching over them although any other suitable visual modification can be used. The center of the Windows task bar is then labeled to identify it as the host computer's task bar (step 54).

The bitmap image is then examined to determine if it includes any windows related to the application sharing program (step 62). If the bitmap image includes any such windows, a hatched pattern is drawn over these windows and the windows are labeled to identify them as the host computer's windows (step 64). During step 64, the image modifying routine sends a query to the operating system for information relating to any windows that overlay a window to be hatched. The rectangular overlapping regions are determined and are subtracted from the rectangle of the window being hatched. With these steps performed, the bitmap image of the host computer desktop is released to the application sharing program so that it may be transmitted to the guest computer (step 66).

Appendix A shows pseudo-code of the image modifying routine.

Figure 3A:
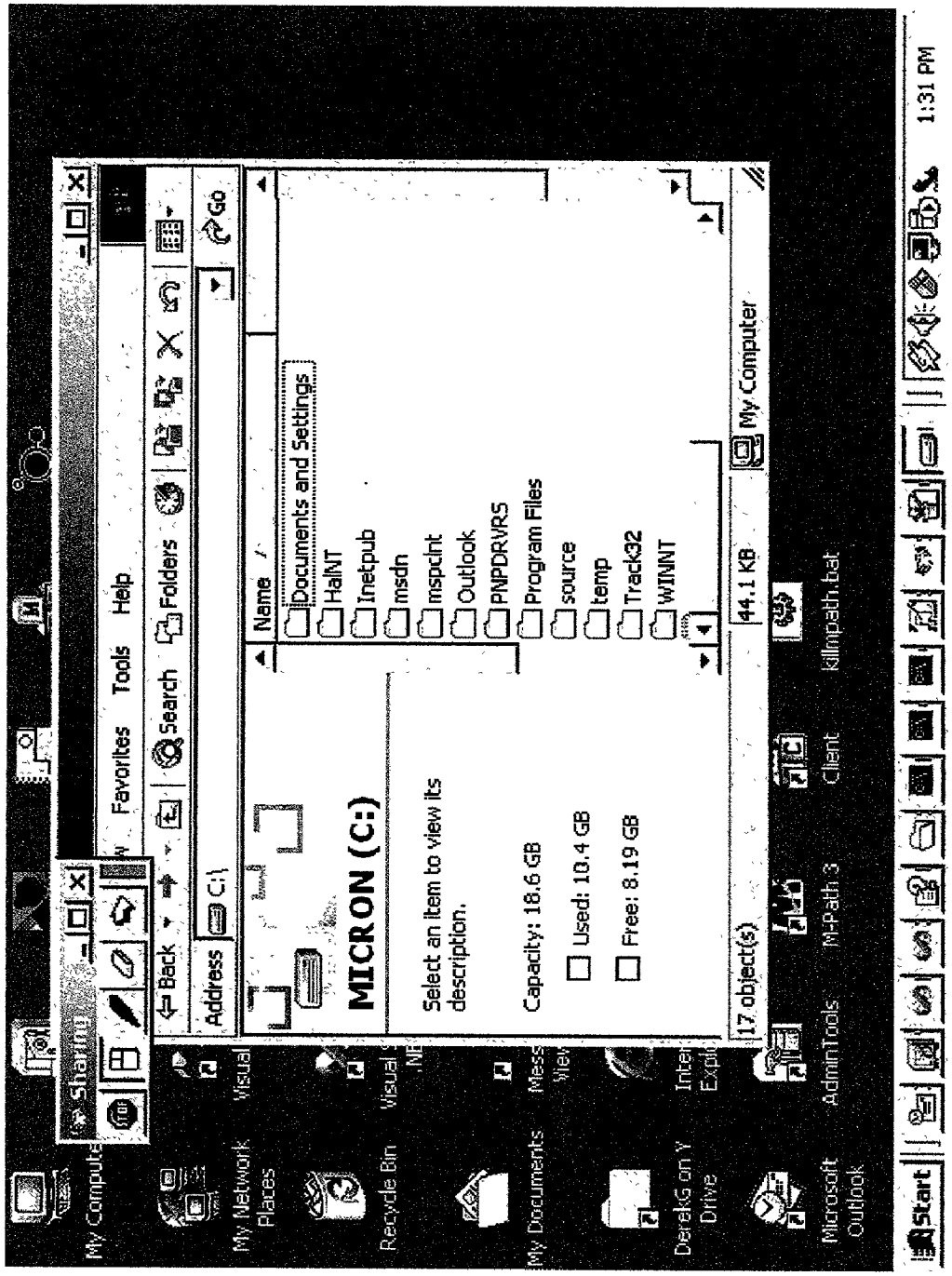
FIGS. 3a to 3c are screen shots showing a host computer desktop image before being modified by the image modifying routine, after having been modified by the image modifying routine, and as presented by a guest computer after having been modified by the image modifying routine.
Figure 3B:
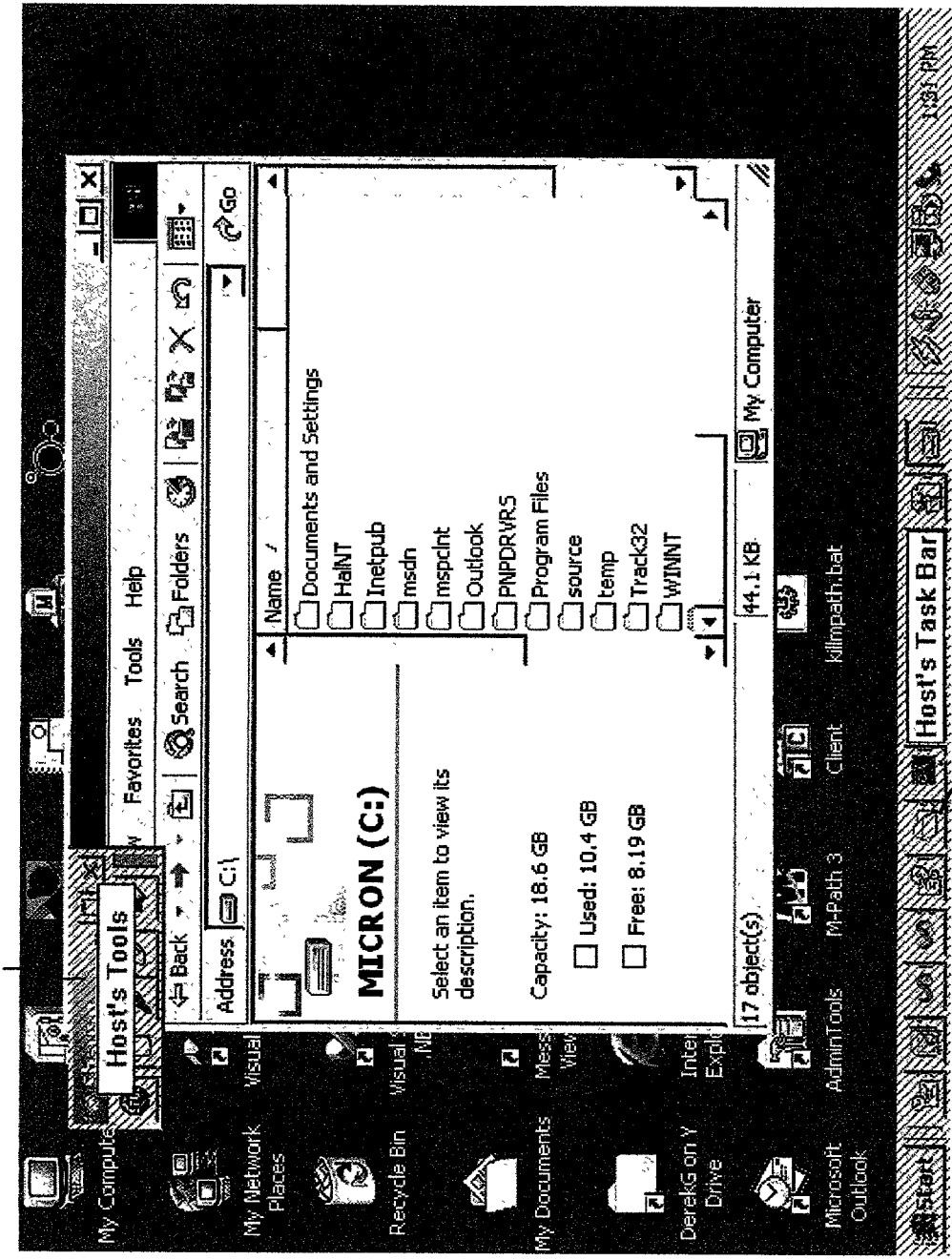
Figure 3C:
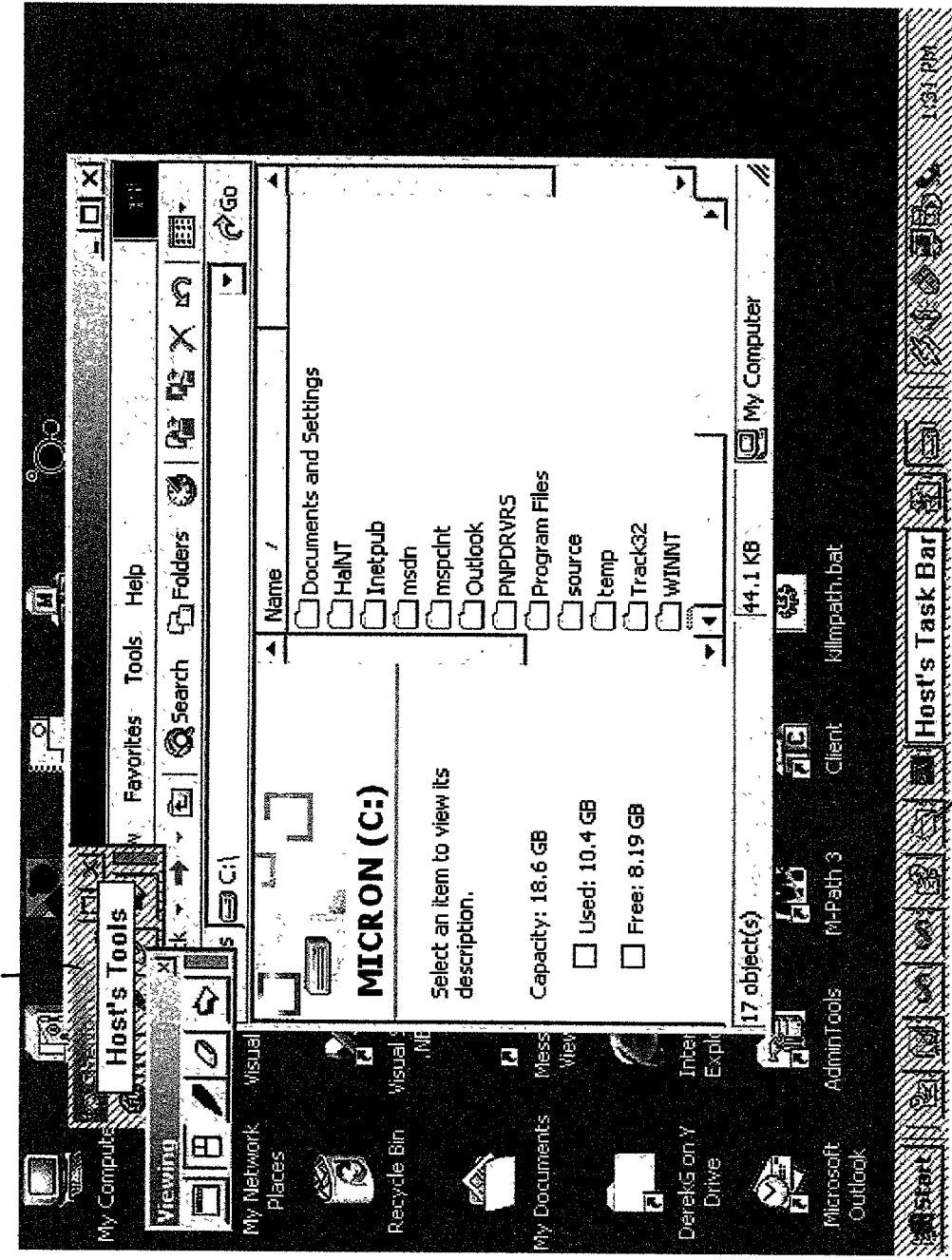

FIG. 3a shows an example of a host computer desktop image 70 prior to be modified by the image modifying routine. FIG. 3b shows the host computer desktop image as modified by the image modifying routine. As can be seen, the Windows task bar 72 has been hatched and is labelled to identify it as the host computer's task bar. The tool window 74 is also hatched and is labeled to identify it as the host computer's tools. FIG. 3c shows the modified host computer desktop image as displayed by the guest computer. As will be appreciated, without the visual modifications to the host computer desktop image 70, it is very difficult to distinguish between the desktop graphical user interface of the guest computer and the host computer desktop image.

Figure 4A:
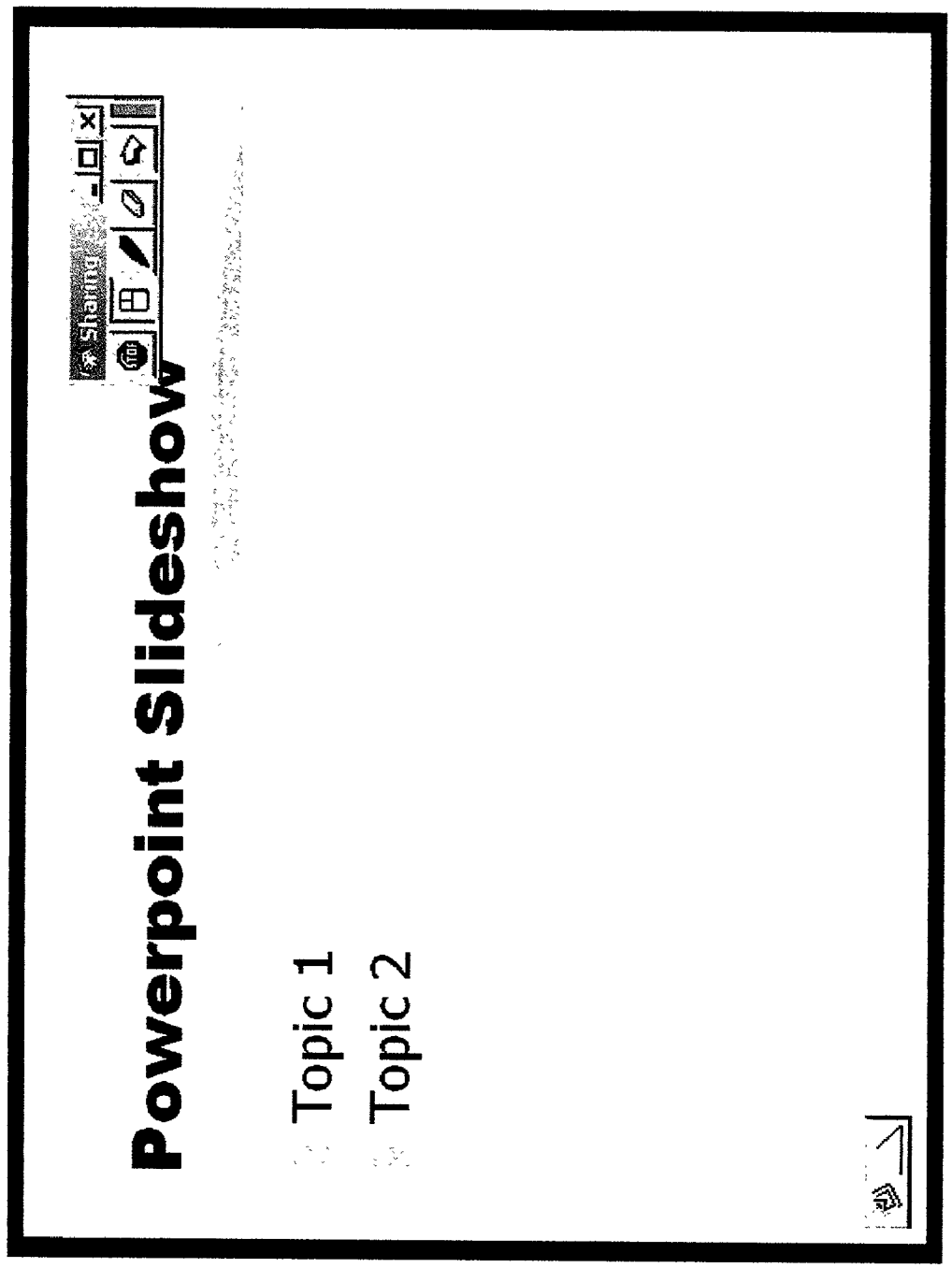
FIGS. 4a and 4b are screen shots showing a host computer desktop image before being modified by the image modifying routine and as presented by a guest computer after having been modified by the image modifying routine.
Figure 4B:
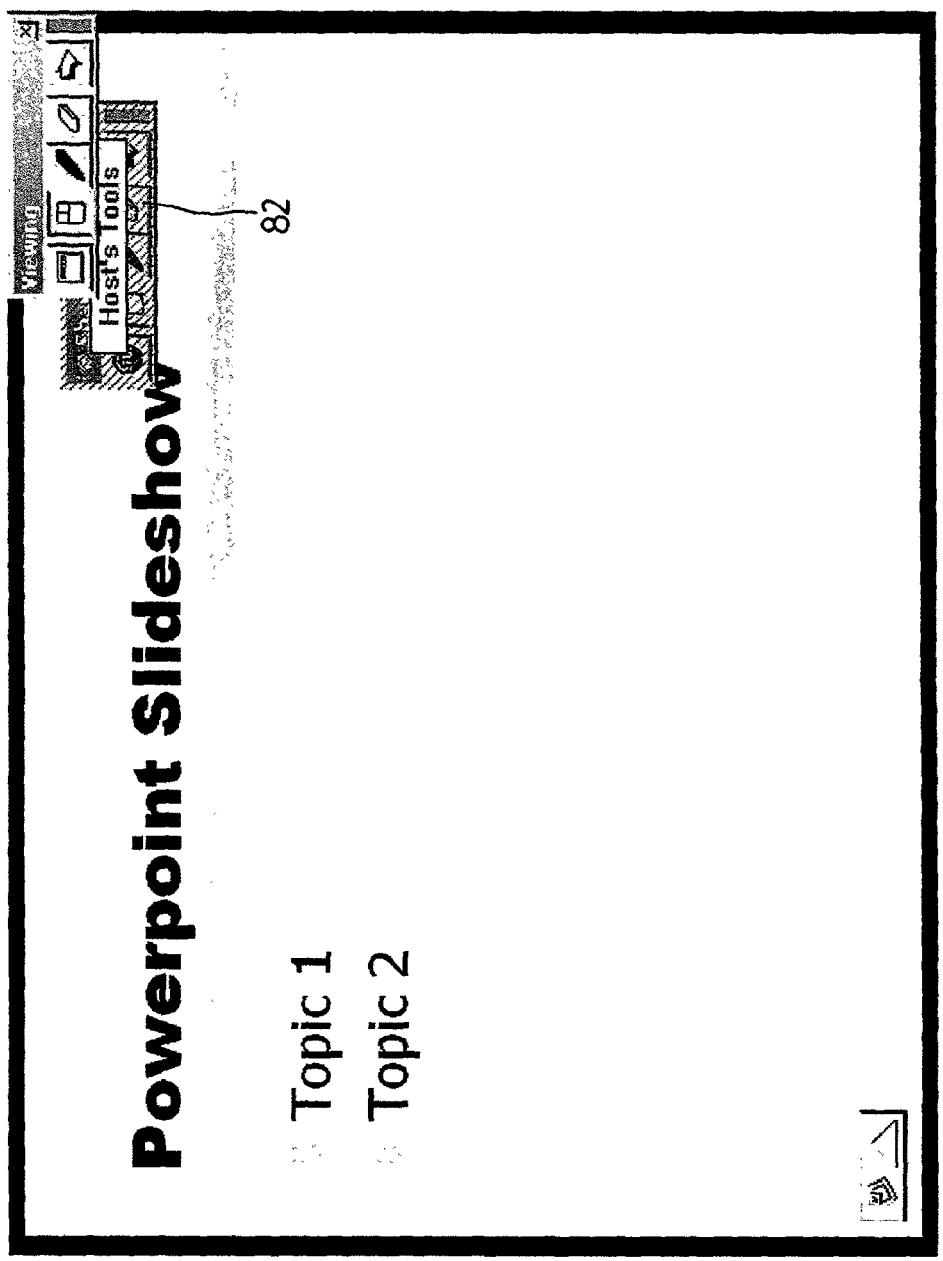

FIG. 4a shows another example of a host computer desktop image 80 prior to be modified by the image modifying routine. In this example, the host computer desktop image is a Powerpoint image. FIG. 4b shows the Powerpoint image 80 as displayed by the guest computer after having been modified by the image modifying routine. As can be seen, the tool window 82 is hatched and is labelled to identify it as the host computer's tools.

Figure 5:
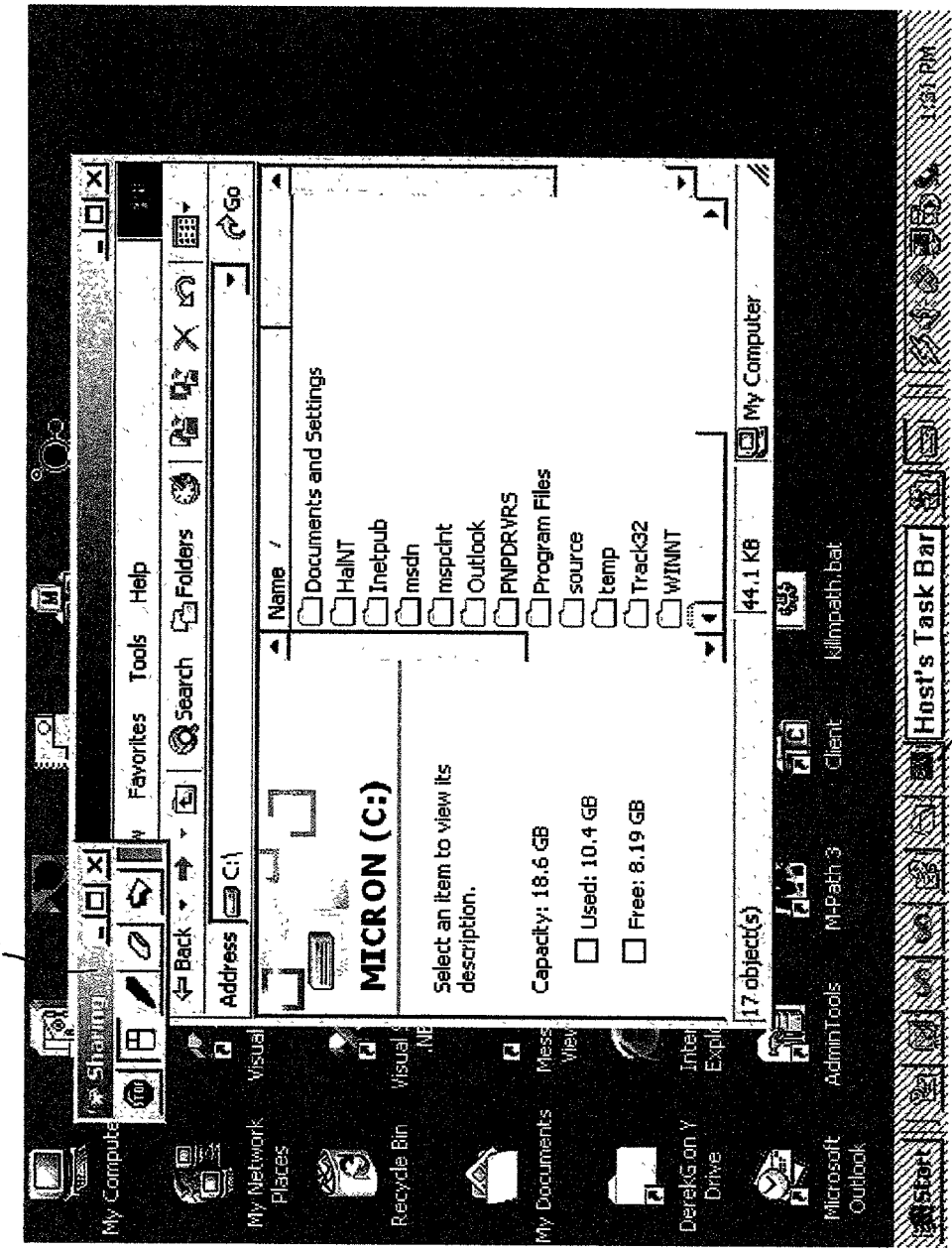
FIG. 5 is a screen shot showing the host computer desktop image of FIG. 3a after having been modified by an alternative embodiment of the image modifying routine.

Although the image modifying routine has been described as modifying the Windows task bar and windows relating to the application sharing program, those of skill in the art will appreciate that a subset of these image sections may be modified. For example, FIG. 5 shows the host computer desktop image 70' of FIG. 3a as modified by the image modifying routine. As can be seen, in this embodiment only the Windows task bar has been hatched and labelled to identify it as the host computer's task bar. The tool window 74' remains unhatched.

Figure 6:
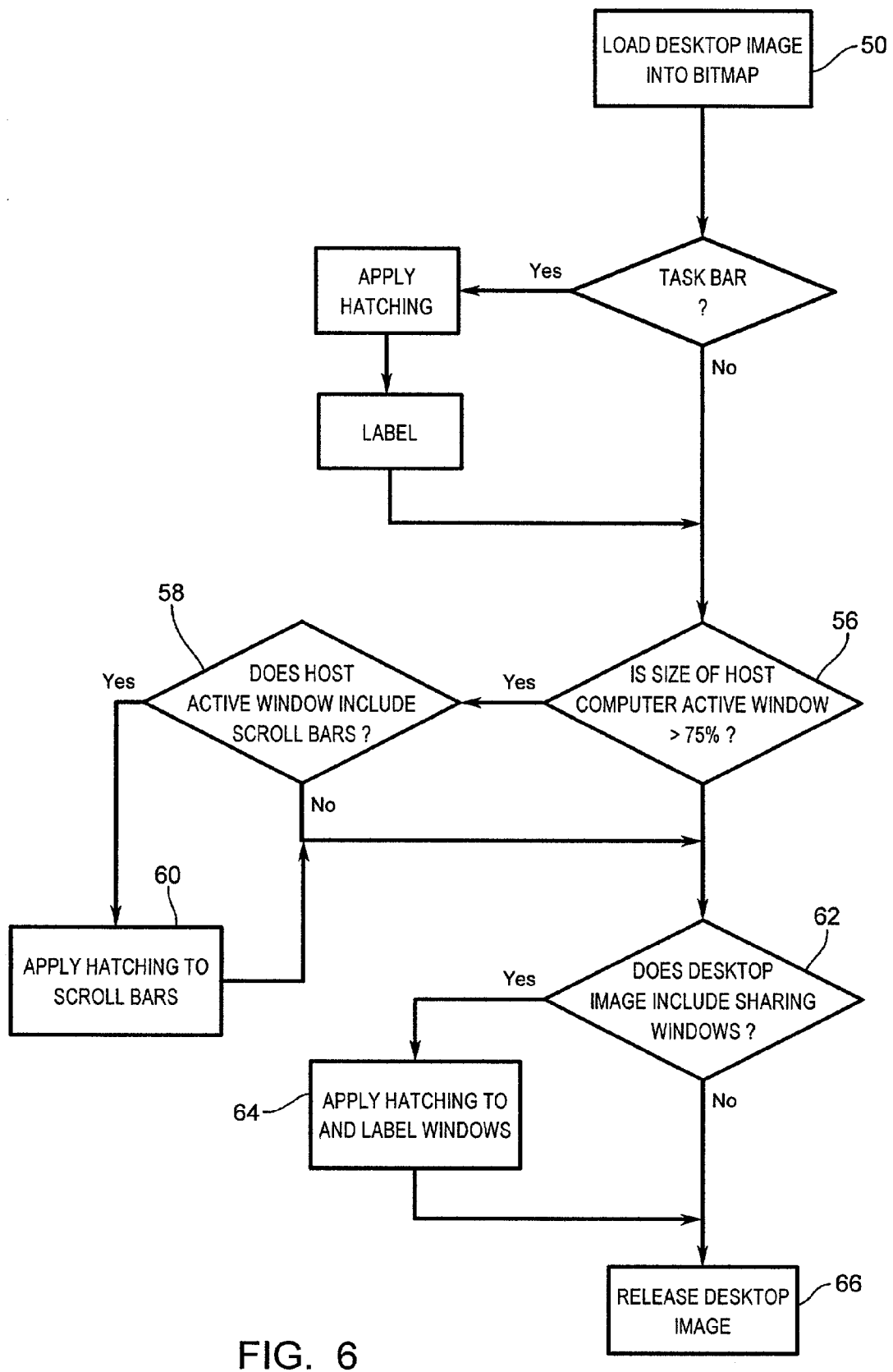
FIG. 6 is a flow chart showing the steps performed by a host computer during execution of an alternative image modifying routine.

Alternatively additional or different image features of the host computer desktop image may be modified by the image modifying application. For example, FIG. 6 shows a flow chart illustrating additional steps performed by the image modifying routine. In this embodiment, after the task bar has been labeled, the current active window of the host computer is located and its size is examined (step 56). If the current active window is greater than 75% of the host computer screen, the bitmap image is examined to determine if the image includes vertical and/or horizontal scroll bars (step 58). If the bitmap image includes vertical and/or horizontal scroll bars, a hatched pattern is drawn over the vertical and/or horizontal scroll bars (step 60).

At step 56, if the current active window is less than 75% of the host computer screen, the image modifying routine proceeds directly to step 62 to determine if the host computer desktop image includes any windows. Also, at step 58, if the bitmap image does not include any vertical and/or horizontal scroll bars, the image modifying routine proceeds to step 62 to determine if the host computer desktop image includes any windows related to the application sharing program.

If desired, the image modifying routine can be configured to hatch and label the task bar only when the task bar is not active. In this manner, if the task bar is the focus of attention and is active, users of guest computers are not distracted by the hatching.

In addition, although the image modifying routine is described as being executed by the host computer with the host computer desktop images being modified prior to transmission to the guest computers, those of skill in the art will appreciate that the guest computers may execute the image modifying routine. In this case, the host computer desktop images and the regions of all of the relevant windows therein are transmitted by the host computer unmodified. When the host computer desktop images and window regions are received by the guest computers, they are modified by the image modifying routines prior to being presented.

Those of skill in the art will appreciate that the computer network of FIG. 1 is shown for illustrative purposes only. The computer network may take virtually any form where two or more computers run an application sharing program and share displayed information.

Although preferred embodiments of the present invention have been described, those of skill in the art will appreciate that variations and modifications may be made without departing from the spirit and scope thereof as defined by the appended claims.

Appendix A

```
HBITMAP GetModifiedScreenBitmap( )
{
// Step ONE: Gab the screen BITMAP
    ScreenBitmap=GrabTheScreen( );
//Step Two: Find the task bar window and see if it is visible
WINDOW    TaskBarWindow=FindWindow("Shell_Tray-
    Wnd")
If (IsWindowVisible(TaskBarWindow))
{
//The task bar window is visible. Draw the hatching on the
    screen window
REGION TaskBarRegion=GetVisibleWindowRegion(Task-
    BarWindow);
DrawHatchedArea(ScreenBitmap, TaskBarRegion);
DrawBlueTitleBox(ScreenBitmap, TaskBarRegion);
{
//Step THREE: Do the same for any windows associated with
    the desktop sharing application
WINDOW
    MyWindow=GetFirstDesktopSharingApplicationWindow(
    ); while (MyWindow!=0)
{
If (IsWindowVisible(MyWindow))
{
//An application window is visible. Draw the hatching on the
    screen window
REGION  ToolRegion=GetVisibleWindowRegion(MyTool-
    Window);
DrawHatchedArea(ScreenBitmap, ToolRegion);
DrawBlueTitleBox(ScreenBitmap, ToolRegion);
{
MyWindow=GetNextDesktopSharingApplicationWindow
    (MyWindow);
{
// Sometimes our window is visible but overlapped by other
    stuff. To deal with this, we ask the operating system to tell
    us about all the windows above the one we are hatching out
    and we subtract their rectangles from the original region.
    The remaniting region is that part of our window that is
    visible.
REGION GetVisibleWindowRegion(WINDOW Window)
{
// Get the region of the window we are interested in. This will
    be a rectangle.
REGION RegionOriginal=GetWindowRegion(Window);
// Find each window above it
WINDOW NextWindow=GetNextWindow(Window);
While (NextWindow !=NULL)
{
//Get the boudaries of the window above it
REGION Overlapped= GetWindowRegion(NextWindow);
//Subtract the window above it from the original window
    boundaries.
Subtract(RegionOriginal, Overlapped);
//And repeat until there are no more windows above the one
    we are getting a rectangle for. NextWindow = GetNex-
    tWindow(Window);
{
return RegionOriginal;
{
```

What is claimed is:

1. In a distributed computer network where a host computer communicates with at least one remote computer and an image of the host computer's desktop is shared with said at least one remote computer, said host computer and at least one remote computer each operating in a multiple-window graphic user interface environment and running an application sharing program, a method of sharing an image of the host computer desktop comprising the steps of:

at the host computer, identifying displayed elements of the host computer desktop associated with both the application sharing program and control tools of said multiple-window graphic user interface environment;

transmitting image data representing the image of the host computer desktop from the host computer to said at least one remote computer; and at the at least one remote computer, upon receipt of the image data automatically displaying a visually modified image of the host computer desktop in full screen, said visually modified image of the host computer desktop being a replica of said host computer desktop and further comprising visual demarcations overlying at least one of the identified displayed elements of the host computer desktop, said visual demarcations constituting a visual cue to a viewer that the full screen modified image of the host computer desktop displayed by the at least one remote computer is not a local desktop of said at least one remote computer.

2. The method of claim 1 wherein said identified displayed elements comprise windows of said application sharing program and at least one of task and scroll bars of said multiple-window graphic user interface environment.

3. The method of claim 1 wherein said identified displayed elements comprise windows of said application sharing program and both task and scroll bars of said multiple-window graphic user interface environment.

4. The method of claim 2 wherein said visual demarcations comprise hatching.

5. The method of claim 4 wherein said visual demarcations further comprise labeling.

6. The method of claim 2 wherein the image of said host computer desktop is visually modified prior to transmission of said image data to said at least one remote computer.

7. The method of claim 2 wherein the image of said host computer desktop image is visually modified after transmission of said image data to said at least one remote computer.

8. The method of claim 3 wherein said visual demarcations comprise hatching.

9. The method of claim 8 wherein said visual demarcations further comprise labeling.

10. The method of claim 3 wherein the image of said host computer desktop is visually modified prior to transmission of said image data to said at least one remote computer.

11. The method of claim 3 wherein the image of said host computer desktop is visually modified after transmission of said image data to said at least one remote computer.

12. The method of claim 6 wherein said visual demarcations comprise hatching.

13. The method of claim 7 wherein said visual demarcations comprise hatching.

14. The method of claim 1 wherein the image of said host computer desktop is visually modified prior to transmission of said image data to said at least one remote computer.

15. The method of claim 1 wherein the image of said host computer desktop is visually modified after transmission of said image data to said at least one remote computer.

16. The method of claim 14 wherein said visual demarcations comprise hatching.

17. The method of claim 15 wherein said visual demarcations comprise hatching.

18. The method of claim 1 wherein visual demarcations overlie each of the identified displayed elements of the host computer desktop.

19. The method of claim 18 wherein said visual demarcations comprise hatching.

20. The method of claim 18 wherein the image of said host computer desktop is visually modified prior to transmission of said image data to said at least one remote computer.

21. The method of claim 18 wherein the image of said host computer desktop is visually modified after transmission of said image data to said at least one remote computer.

22. The method of claim 20 wherein said visual demarcations comprise hatching.

23. The method of claim 21 wherein said visual demarcations comprise hatching.

24. The method of claim 18 wherein said identified displayed elements comprise windows of said application sharing program and at least one of task and scroll bars of said multiple-window graphic user interface environment.

25. The method of claim 18 wherein said identified displayed elements comprise windows of said application sharing program and both task and scroll bars of said multiple-window graphic user interface environment.

26. The method of claim 24 wherein the image of said host computer desktop is visually modified prior to transmission of said image data to said at least one remote computer.

27. The method of claim 26 wherein said visual demarcations comprise hatching.

28. The method of claim 25 wherein the image of said host computer desktop is visually modified after transmission of said image data to said at least one remote computer.

29. The method of claim 28 wherein said visual demarcations comprise hatching.

* * * * *